United States Patent [19]

Steele et al.

[11] Patent Number: 4,911,032

[45] Date of Patent: Mar. 27, 1990

[54] ONE-WAY GEAR

[75] Inventors: Ronald J. Steele, Wyndmoor, Pa.; Eugene M. Lorincz, Cinnaminson, N.J.

[73] Assignee: Moore Push-Pin Company, Wyndmoor, Pa.

[21] Appl. No.: 252,596

[22] Filed: Oct. 3, 1988

[51] Int. Cl.[4] .................. F16H 55/02; F16H 55/08
[52] U.S. Cl. .................... 74/462; 74/437; 188/82.1
[58] Field of Search .............. 74/435, 437, 462; 188/82.1, 292

[56] References Cited

U.S. PATENT DOCUMENTS

| | | | |
|---|---|---|---|
| 466,923 | 1/1892 | Price | 74/437 |
| 2,399,925 | 5/1946 | Hewlett | 74/437 |
| 2,436,231 | 2/1948 | Schellens | 310/41 |
| 3,206,997 | 9/1965 | Hardy | 74/462 |
| 4,041,794 | 8/1977 | Belot | 74/460 |
| 4,051,744 | 10/1977 | Oshima | 74/437 |
| 4,108,016 | 8/1978 | Muranishi | 74/462 |
| 4,200,000 | 4/1980 | Fluehmann | 74/437 |
| 4,207,777 | 6/1980 | Fluehmann | 74/462 |
| 4,223,528 | 9/1980 | Vuilleumier | 368/220 |
| 4,321,839 | 3/1982 | Vuilleumier | 74/462 |
| 4,653,340 | 3/1987 | La Bate | 74/462 |

FOREIGN PATENT DOCUMENTS 1157102  5/1958  France .................. 74/437

Primary Examiner—Allan D. Herrmann
Assistant Examiner—Janice E. Chartoff
Attorney, Agent, or Firm—William H. Eilberg

[57] ABSTRACT

A modified gear operates in one direction only. The modified gear can be driven in either direction by a standard gear, but will drive another gear in only one direction. Every other tooth of the modified gear is partly cut away to form a step. The remaining sides are cut away to delay engagement with a driven gear. The sides of the teeth preferably have the shape of an involute curve, and each tooth is preferably cut along a line segment beginning at the midpoint of the top land of the tooth, and continuing along a path generally parallel to one side of the tooth. The step is located at a predetermined radial distance from the top land, this distance being a certain fraction of the total depth of the tooth. The modified gear can be used to drive, or be driven by, a conventional unmodified gear. It can also drive, or be driven by, another gear which has been modified in the manner described above.

14 Claims, 3 Drawing Sheets

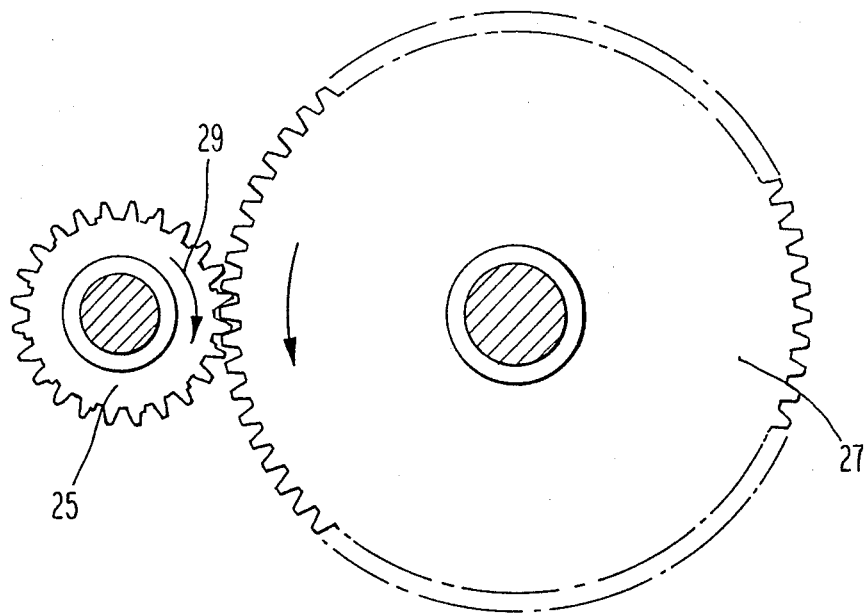
_Fig. 1_
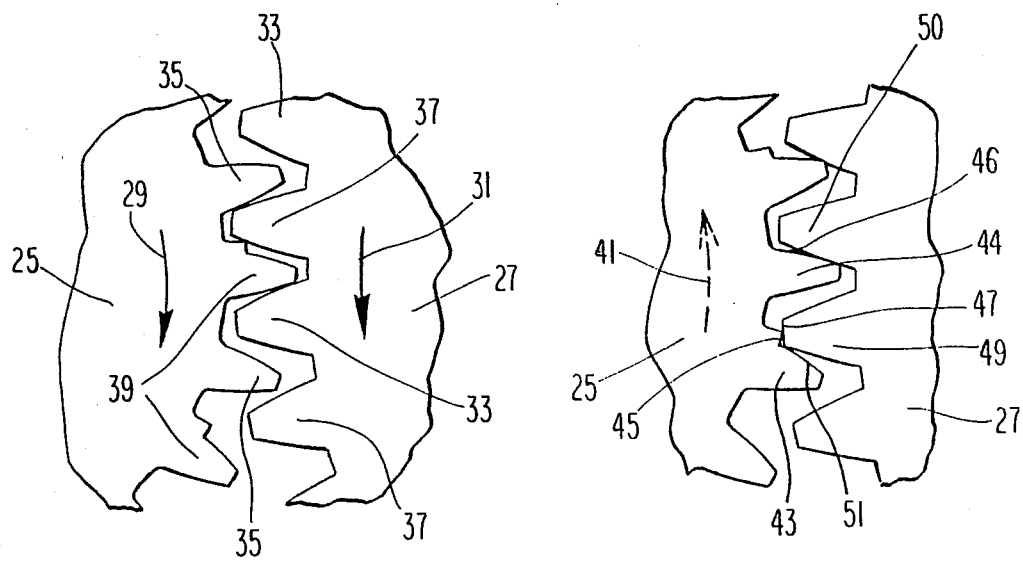
_Fig. 2a_     _Fig. 2b_

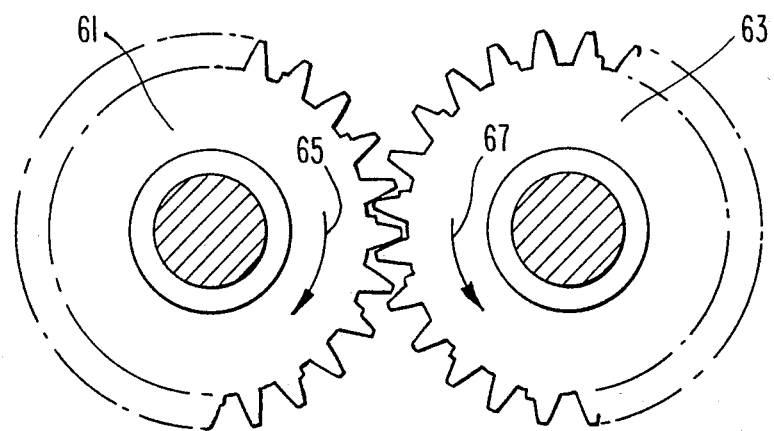
Fig. 4
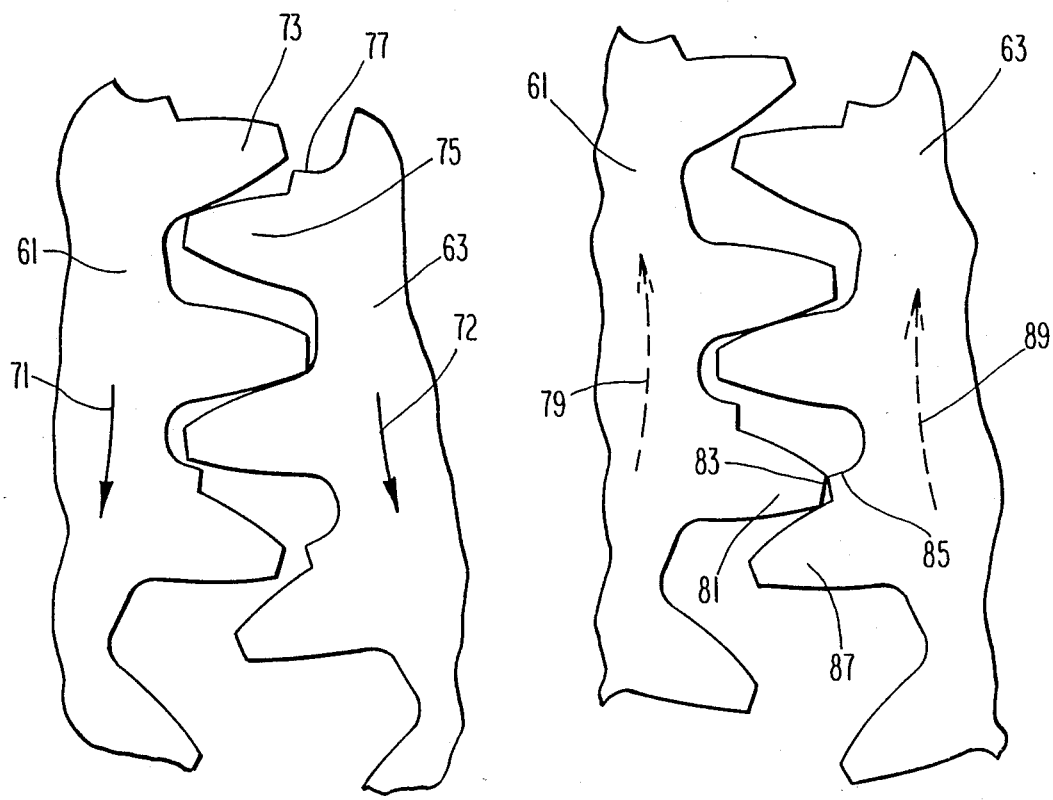
Fig. 5a  Fig. 5b

ONE-WAY GEAR

BACKGROUND OF THE INVENTION

This invention is a one-way gear, i.e. a gear which can drive another gear in one direction only.

Various types of one-way gears have been known in the prior art. Such gears are useful in a variety of applications, including the manufacture of watches and clocks, the manufacture of motors, and in any other field in which rotational motion is transmitted from one member to another.

U.S. Pat. No. 2,436,231 contains an example of a one-way gear. The latter patent discloses a synchronous motor which starts at random, in either direction, when electric power is applied. The patent provides a gear which allows the motor to turn in the desired direction, and which causes the gear to "lock" if the motor attempts to turn the gear in the other direction. Each tooth of the gear has steps which prevent motion in the undesired direction. The steps play no role in the rotation of the gear in the normal direction. The modified gears of the latter patent must be used in pairs; it is not possible to achieve the desired locking effect when the modified gear engages a standard gear.

U.S. Pat. No. 2,399,925 shows another unidirectional gear drive, this drive having teeth which are alternately wide and narrow. U.S. Pat. No. 4,041,794 shows a one-way gear drive in which the module, or tooth size, varies between the two gears. Further examples of unidirectional gear drives are given in U.S. Pat. Nos. 4,321,839, 4,223,528, 4,207,777, 4,200,000, 4,108,016,and 4,051,744.

The present invention provides a one-way gear which can be used either in pairs or in conjunction with a standard gear. It can be driven at high speeds without jamming, and provides a very positive locking effect, preventing movement in the undesired direction. The invention can be used in a wide variety of applications.

SUMMARY OF THE INVENTION

The one-way gear of the present invention is made by modifying the teeth of a conventional gear. The gear is preferably a spur gear, its teeth having the shape of a standard involute curve. The gear is modified by forming a step on every other tooth, and by cutting away a portion of the remaining teeth. More specifically, each step is formed by cutting the tooth along a line which begins at the midpoint of the top land of the tooth, and which continues along a path which is generally parallel to the side of the tooth.

The position of the step is chosen such that the ratio of the radial distance between the step and the top land, to the entire depth of the tooth, is in the range of about 0.33–0.75.The fraction 0.667 (two-thirds) has been found to work especially well.

The teeth which are not formed with steps (the "unstepped" teeth) are cut away along a line of cutting which also begins at the midpoint of the top land, and which continues along a path which is generally parallel to the side of the tooth, until the tooth is cut virtually down to the bottom land between the teeth. This cutting away of the unstepped teeth causes the engagement of gears to be delayed somewhat. As will be more fully described below, the delayed engagement is necessary to insure that the gears will lock as desired.

The modified gear of the present invention ca be used with another similarly formed gear, or it can be used with a conventional gear. In the latter case, the conventional gear can drive the modified gear in either direction, but the modified gear can drive the conventional gear in only one direction. In the former case, both gears can drive the other in one direction only, but will lock when it is attempted to drive them in the other direction.

It is therefore an object of the invention to provide a gear which will operate in one direction only.

It is another object of the invention to provide a one-way gear which can be used either with another, similarly modified gear, or with a conventional unmodified gear.

It is another object to provide a gear system in which each gear can drive the other gear in one direction only.

It is another object to provide a gear system in which a first gear can drive the second gear in either direction, but wherein the second gear can drive the first gear in one direction only.

It is another object to provide a one-way gear which can be used with a variety of forms of gears.

It is another object to provide a one-way gear which can run at high speeds without jamming.

It is another object to provide a one-way gear in which the gear is very securely prevented from rotating in the undesired direction.

Other objects and advantages of the invention will be apparent to those skilled in the art, from a reading of the following brief description of the drawings, the detailed description of the invention, and the appended claims.

BRIEF DESCRIPTION OF THE DRAWINGS

FIG. 1 is a fragmentary, cross-sectional view, showing two gears in engagement, the gear at the left having been modified according to the present invention.

FIG. 2a is a fragmentary view of the engagement of the gears of FIG. 1, showing the directions in which each gear can freely drive the other.

FIG. 2b is a fragmentary view of the engagement of the gears of FIG. 1, showing how the gears will lock when one attempts to use the modified gear to drive the unmodified gear in the undesired direction.

FIG. 4 is a fragmentary, cross-sectional view, showing two gears in engagement, wherein both gears have been modified according to the present invention.

FIG. 5a is a fragmentary view of the engagement of the gears of FIG. 4, show directions in which each gear can freely drive the other.

FIG. 5b is a fragmentary view of the engagement of the gears of FIG. 4, showing how the gears will lock when one attempts to use one gear to drive the other gear in the undesired direction.

DETAILED DESCRIPTION OF THE INVENTION

Figure 3:
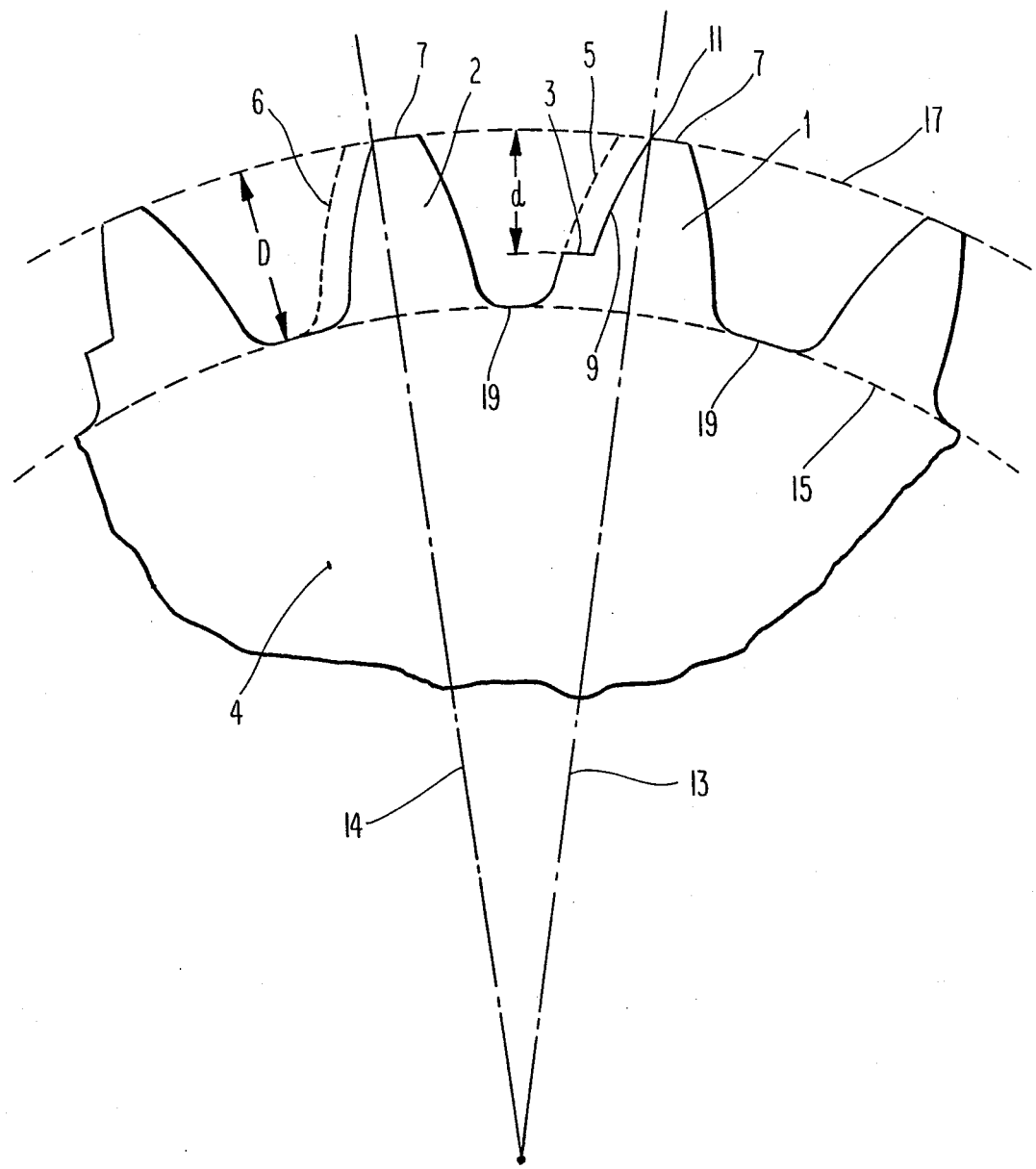
FIG. 3 is a diagram of a fragment of a modified gear, made according to the present invention.

FIG. 3 shows a portion of a modified gear made according to the present invention. The gear shown is a spur gear 4 in which every other tooth includes a "step", and in which the remaining teeth have been cut away in the manner described more precisely below. FIG. 3 shows two teeth with steps and two teeth having one side cut away.

Tooth 1 has been cut to define step 3. Dotted line 5 indicates the shape of tooth 1 before it is cut. The cutting is done along a line which begins at point 11, which is the point of intersection of radius 13 and top land 7 of tooth 1. Radius 13 extends from the center of the gear add bisects tooth 1 and its top land 7. The cutting continues along a path which is generally parallel to dotted line 5, so as to define side 9 of tooth 1. Thus, side 9 has the same general curvature as dotted line 5. Side 9 terminates at a point which determines the location of step 3.

The location of step 3 can be expressed in terms of the geometrical features of the gear. The depth of each tooth is equal to the radial distance between circles 15 and 17. The diameter of circle 15, which circle coincides with bottom lands 19 of the gear teeth, is known as the "inside diameter" (also known as the "root diameter") of the gear. The diameter of circle 17, which circle coincides with the top lands of the teeth, is called the "outside diameter" of the gear. The radial distance between these circles is denoted by D; the distance D is known as the depth (or the "whole depth") of the tooth. The radial distance between step 3, the surface of which is generally parallel to circles 17 and 19, and circle 17, is indicated by d. The fraction d/D, referred to herein as the "step parameter", is the principal parameter of interest in the design of a gear according to the present invention. In the preferred embodiment, the step parameter is about 0.667. But it has been found, by experimentation, that the step parameter can be in the range of about 0.333 to about 0.750. The preferred value of the step parameter should not be interpreted to limit the invention.

In the case of tooth 2, one side of the tooth is cut away in the same manner as described above, except that the entire side is cut away, thus leaving no step. That is, the cutting begins at the midpoint of top land 7, i.e. the point of intersection between the top land and radius 14, which bisects the top land, and continues along a path generally parallel to dotted line 6, the latter dotted line representing the shape of the tooth before it is cut. The cutting is continued all the way to the bottom land 19. Thus, one could describe tooth 2 as having a step parameter equal to one.

Every other tooth of gear 4 is formed with a step, and all of the remaining teeth have sides which are cut away as shown.

FIG. 1 shows a pair of engaged gears 25 and 27. Gear 5 is modified according to the present invention, and gear 27 is a conventional, unmodified gear. For the reasons explained below, gear 27 can drive gear 25 in either direction, but gear 25 can drive gear 27 only in the direction indicated by arrow 29.

FIGS. 2a and 2b illustrate the operation of the gear of the present invention in more detail. First, consider what happens when conventional gear 27 is the driving gear, and when gear 27 rotates in the direction indicated by arrow 31. Those teeth 33 of gear 27 which engage the unstepped teeth of gear 25 (i.e. teeth 35) operate in a conventional, unimpeded manner. The teeth 37 which engage stepped teeth 39 also operate normally, because teeth 37 can initially push against the step, as shown in the figure. The result is that gear 27 drives gear 25.

Now suppose that gear 27 rotates in the direction opposite to that indicate by arrow 31. Then it is apparent, from the figure, that all teeth of gear 27 engage the unmodified sides of the teeth of gear 25. Thus, the steps and cut-away sides of the teeth have no effect on the engagement of the gears. The result is, again, that gear 27 drives gear 25 in a normal manner.

Suppose that gear 25 is the driving gear, and that gear 25 rotates as shown by arrow 29. Then the engagement of gears is caused by pressure from the unmodified sides of the teeth of gear 25. Thus, gear 25 drives gear 27 in a normal fashion.

If gear 25 is the driving gear, and if one attempts to drive gear 25 in the other direction, as shown by arrow 41 of FIG. 2b, the gears will lock. In particular, step 45 of tooth 43 abuts top land 47 of tooth 49. Due to the combined abutment of the step and the top land, and the abutment of side 51 of tooth 43 against the edge of top land 47 of tooth 49, the tooth becomes caught on the step, and gear 25 cannot move gear 27 further.

As explained above, those teeth of the modified gear which do not have steps are partially cut away. The reason for this modification of the unstepped teeth is to insure that the gears will lock properly. FIG. 2b illustrates why this modification is needed. If side 46 of unstepped tooth 44 were not cut away as shown, then as gear 25 moves in the direction of arrow 41, tooth 44 would begin to engage tooth 50 slightly earlier than as shown. Gear 27 would begin to move sooner, and, eventually, tooth 49 would be urged upward, to the point where tooth 49 would be carried "over" step 45. Thus, tooth 49 would not be caught on the step, but would pass into the recess between the step and the next tooth.

But because tooth 44 has been cut away, as shown, the engagement of tooth 44 and tooth 50 is slightly delayed. When gear 27 does begin to move, tooth 49 becomes caught on step 45. Thus, cutting away a portion of the unstepped teeth insures that the desired locking of the gears will occur.

The requirement that the unstepped teeth be cut away is equivalent to requiring that there be some backlash in the direction in which the gears are intended to lock. However, the requirement is more precisely stated as explained above, i.e. that the engagement of the gears be delayed to insure that the gears will lock.

As shown above, the preferred means for achieving this delayed engagement is to cut away a portion of the sides of the unstepped teeth. Other means of delaying engagement can be used. It may be possible to cut away other, selected portions of the unstepped teeth, to achieve the same result. However, it is believed that the pattern of cutting illustrated in the figures is the most economical and convenient.

FIGS. 4, 5a, and 5b illustrate another embodiment of the invention, showing a pair of gears wherein both gears are modified according to the present invention. It will be shown that gear 61 can drive gear 63 in the direction indicated by arrow 65, but not in the opposite direction. Similarly, gear 63 can drive gear 61 in the direction indicated by arrow 67, but not in the opposite direction. FIGS. 5a and 5b show why the above statements are true.

First suppose that gear 61 is the driving gear. If gear 61 rotates in the direction indicated by arrow 71, then the teeth of gear 61 engage the teeth of gear 63 without impediment. Note that the side of tooth 73 first engages the side of tooth 75, and pushes on tooth 75 before step 77 can come into contact with tooth 73. By the time tooth 73 contacts step 77, the latter step has rotated into a position which does tooth interfere with the movement of tooth 73. Thus, gear 61 can freely drive gear 63.

If one attempts to drive gear 61 in the opposite direction, as shown by arrow 79 of FIG. 5b, then top land 83 of tooth 81 interferes with step 85 of tooth 87, and the two gears become locked.

If gear 63 is the driving gear, and if gear 63 rotates in the direction indicated by arrow 72, then gear 63 drives gear 61 without impediment, because the teeth of gear 63 engage the teeth of gear 61 in the same manner in which the teeth of gear 61 engage the teeth of gear 63 as described above. But if gear 63 rotates in the direction shown by arrow 89, in FIG. 5b, then the gears will lock, for the same reason given above.

The reason for cutting away of the unstepped teeth, in the embodiment of FIGS. 4 and 5 is exactly the same as described above, with respect to the first embodiment.

As is apparent from the figures and the above description, when a gear is rotated in a manner which causes the gear to lock, the locking effect may not occur immediately, but must await the engagement of the step and top land of an appropriate pair of teeth.

Because there is a step on every other tooth of the modified gear of the present invention, it is necessary that the gear be constructed with an even number of teeth.

The gear of the present invention can be made of metal, or it can be formed of a stiff non-metallic material, such as is commonly used in making gears. The specific choice of material forms no part of this invention.

While the invention has been described with respect to one embodiment, it is understood that other variations are possible, within the scope of the disclosure. It is possible to apply the principle of the invention to gears having steps on every third tooth, instead of every other tooth. The precise location of the steps can also be varied. There may be other ways of achieving the necessary delay in engagement, described above. These and other modifications should be deemed within the spirit and scope of the following claims.

What is claimed is:

1. In a gear, the gear having a plurality of teeth, each tooth having first and second sides, a top land, and a bottom, the improvement wherein a portion of the first side of at least one tooth is cut away to define a step, wherein at least one tooth is stepless, and wherein the first side of each stepless tooth is cut away along substantially the entire depth of said stepless tooth, such that the width of each stepped tooth is greater than the width of each stepless tooth, said widths being measured at the bottom of each tooth.

2. The improvement of claim 1, wherein the step is defined by a line beginning at the midpoint of the top land of an uncut tooth, the line continuing along a path which is generally parallel to the first side of the tooth, the line ending at a point which determines the location of the step.

3. The improvement of claim 2, wherein the radial distance between the step and the top land of the tooth is in the range of about 0.33–0.75 times the depth of the tooth.

4. The improvement of claim 3, wherein the radial distance between the step and the top land of the tooth is about 0.667 times the depth of the tooth.

5. The improvement of claim 1, wherein each side of each uncut tooth has the shape of an involute curve.

6. The improvement of claim 1, wherein the distance between the sides of adjacent teeth is generally greater than the width of each tooth.

7. In a gear, the gear being configured as a driving gear connected to operate a driven gear, the driving gear having a plurality of teeth, each tooth having first and second sides and a top land, the improvement wherein a portion of the first side of at least one tooth of the driving gear is cut away to define a step, wherein at least one tooth of the driving gear is stepless, and wherein the first side of each stepless tooth of the driving gear includes means for delaying engagement with the teeth of the driven gear, the amount of delay being sufficient to cause the teeth of the driven gear to become caught on the steps of the driving gear.

8. A pair of gears, the gears having teeth which mesh with each other, each tooth having first and second sides, a top land, and a bottom, wherein a portion of the first side of at least one tooth of at least one of said gears is cut away to define a step, wherein at least one tooth of said gear is stepless, and wherein the first side of each stepless tooth of said gear is cut away along substantially the entire depth of said stepless tooth, such that the width of each stepped tooth is greater than the width of each stepless tooth, said widths being measured at the bottom of each tooth.

9. The gear pair of claim 8, wherein one of the gears has teeth with steps, and wherein the other of the gears goes not have any teeth with steps.

10. The gear pair of claim 8, wherein both of the gears have teeth with steps.

11. The gear pair of claim 8, wherein the distance between the sides of adjacent teeth is generally greater than the width of each tooth.

12. A pair of gears, the gears having teeth which mesh with each other, each tooth having first and second sides and a top land, wherein a portion of the first side of at least one tooth of at least one of said gears is cut away to define a step, wherein at least one tooth of one of the gears is stepless, and wherein the first side of each stepless tooth of each gear includes means for delaying engagement with the teeth of the other gear, the amount of delay being sufficient to cause the teeth of the other gear to become caught on the steps of the first gear.

13. In a gear, the gear having a plurality if teeth, each tooth having first and second sides and a top land, the improvement wherein a portion of the first side of every other tooth is cut away to define a step, wherein the remaining teeth are stepless, and wherein the first sides of each of the stepless teeth are cut away along substantially the entire depth of said stepless teeth.

14. In a gear, the gear being configured as a driving gear connected to operate a driven gear, the driving gear having a plurality of teeth, each tooth having first and second sides and a top land, the improvement wherein a portion of the first side of every other tooth of the driving gear is cut away to define a step, the remaining teeth of the driving gear being stepless, and wherein the first sides of each of the stepless teeth of the driving gear include means for delaying engagement with the teeth of the driven gear, the amount of delay being sufficient to cause the teeth of the driven gear to become caught on the steps of the driving gear.

* * * * *